United States Patent
Kinsman

(10) Patent No.: US 12,292,143 B2
(45) Date of Patent: May 6, 2025

(54) DYNAMIC QUICK CONNECTOR COUPLING

(71) Applicant: AEROJET ROCKETDYNE, INC., Melbourne, FL (US)

(72) Inventor: Peter Kinsman, Calabasas, CA (US)

(73) Assignee: AEROJET ROCKETDYNE, INC., Melbourne, FL (US)

( * ) Notice: Subject to any disclaimer, the term of this patent is extended or adjusted under 35 U.S.C. 154(b) by 0 days.

(21) Appl. No.: 18/687,328

(22) PCT Filed: Sep. 15, 2021

(86) PCT No.: PCT/US2021/050409
§ 371 (c)(1),
(2) Date: Feb. 28, 2024

(87) PCT Pub. No.: WO2023/043437
PCT Pub. Date: Mar. 23, 2023

(65) Prior Publication Data
US 2024/0384822 A1    Nov. 21, 2024

(51) Int. Cl.
| | | |
|---|---|---|
| F02K 9/97 | (2006.01) | |
| B64G 1/40 | (2006.01) | |
| F16L 37/252 | (2006.01) | |
| F16L 37/30 | (2006.01) | |
| F16L 37/35 | (2006.01) | |

(52) U.S. Cl.
CPC ............. *F16L 37/35* (2013.01); *B64G 1/402* (2013.01); *F02K 9/97* (2013.01); *F16L 37/252* (2013.01); *F16L 37/30* (2013.01); *F05D 2260/33* (2013.01); *F16L 2201/10* (2013.01)

(58) Field of Classification Search
CPC ....... B64G 1/402; F02K 9/97; F05D 2260/33; F16L 37/23; F16L 37/244; F16L 37/252; F16L 37/30; F16L 37/35; F16L 2201/10
See application file for complete search history.

(56) References Cited

U.S. PATENT DOCUMENTS

| | | |
|---|---|---|
| 5,975,491 A | 11/1999 | Mann |
| 2015/0001844 A1 | 1/2015 | Tiberghien et al. |

FOREIGN PATENT DOCUMENTS

| | | |
|---|---|---|
| CN | 113324120 | 8/2021 |
| DE | 102012209629 | 12/2013 |

OTHER PUBLICATIONS

International Preliminary Report on Patentability for International Application No. PCT/US2021/050409 mailed Mar. 28, 2024.
International Search Report and Written Opinion for International Application No. PCT/US2021/050409 mailed May 13, 2022.

*Primary Examiner* — Scott J Walthour
(74) *Attorney, Agent, or Firm* — Carlson, Gaskey & Olds, P.C.

(57) ABSTRACT

A coupling includes first and second housings, a valve element, and a guide link. The first housing is rotatable relative to the second housing. The first housing has helical cam slots and the second housing has linear cam tracks. The guide link is in the first housing and is fixed with the valve element. The guide link carries cam rollers. The cam rollers ride in the helical slots and the linear cam tracks. Rotation of the first housing causes rotation of the helical slots. The rotation of the helical slots induces the cam rollers to travel along the helical slots and along the linear cam tracks such that the guide link translates linearly. The valve element moves with the guide link between open and closed positions.

20 Claims, 7 Drawing Sheets

DYNAMIC QUICK CONNECTOR COUPLING

BACKGROUND

Quick connector couplings (which may also be known as dry disconnects, dry fittings, dry couplings, or the like) are known and used to connect fluid lines in a leak-free manner where there is a need for repeated connection/disconnection. Such couplings may include cam lock fittings, leur locks, bayonet fittings, or other connection type that permits easy connection/disconnection. There is a diverse variety of quick connector coupling designs, which are usually designed for a target fluid system application. In general, however, many designs includes a "plug" (or male half) and a "socket" (or female half) that can be connected together to provide a sealed fluid joint.

SUMMARY

A coupling according to an example of the present disclosure includes first and second housings. The first housing is rotatable relative to the second housing. The first housing has helical cam slots and the second housing has linear cam tracks, a valve element, and a guide link in the first housing and fixed with the valve element. The guide link carries cam rollers that ride in the helical slots and the linear cam tracks. Rotation of the first housing causes rotation of the helical slots. The rotation of the helical slots induces the cam rollers to travel along the helical slots and along the linear cam tracks such that the guide link translates linearly. The valve element moves with the guide link between open and closed positions.

A further embodiment of any of the foregoing embodiments includes a mating housing securable with the first housing and an additional valve element in the mating housing that is engaged with the valve element such that the movement of the valve element also moves the additional valve element.

In a further embodiment of any of the foregoing embodiments, the mating housing includes a mating housing hub and mating housing spokes supporting the mating housing hub, and the additional valve element extends through the mating housing hub.

In a further embodiment of any of the foregoing embodiments, the additional valve element is a poppet that includes a head that seals against a valve seat in the mating housing and a stem that extends from a backside of the head and through the mating housing hub, and the head includes a frustoconical vane that extends from the backside and defines a cavity around the stem.

A further embodiment of any of the foregoing embodiments includes a spring disposed at least partially in the cavity and biasing the additional valve element toward a sealed position.

In a further embodiment of any of the foregoing embodiments, the stem includes a tapered tip.

In a further embodiment of any of the foregoing embodiments, the first housing includes a hub and spokes supporting the hub, and the valve element extends through the hub.

In a further embodiment of any of the foregoing embodiments, the valve element is a poppet that includes a head that seals against a valve seat in the first housing and a stem that extends from a backside of the head and through the hub, and the head includes a frustoconical vane that extends from the backside and defines a cavity around the stem.

In a further embodiment of any of the foregoing embodiments, the frustoconical vane includes vane slots, and in the closed position, the hub is at least partially disposed in the cavity and the spokes extend through the vane slots.

In a further embodiment of any of the foregoing embodiments, the guide link includes a guide link hub that is fixed with the valve element and guide link arms that extend outwardly from the guide link hub, the guide link arms carrying the cam rollers.

In a further embodiment of any of the foregoing embodiments, the guide link arms each define an open flow window there through.

In a further embodiment of any of the foregoing embodiments, the first housing and the second housing are rotationally secured together in a ball bearing joint.

A further embodiment of any of the foregoing embodiments includes a proximity sensor operable to determine a relative rotational position between the first and second housings.

In a further embodiment of any of the foregoing embodiments, the first housing includes an actuator operable to rotate the first housing.

A rocket motor according to an example of the present disclosure includes a propellant tank that holds propellant, a combustor, a nozzle attached with the combustor, a supply line that fluidly connects the propellant tank and the combustor, and a coupling according to any of the foregoing embodiments that situated in the supply line.

A further embodiment of any of the foregoing embodiments includes a mating housing securable with the first housing and an additional valve element in the mating housing that is engaged with the valve element such that the movement of the valve element also moves the additional valve element. The mating housing includes a mating housing hub and mating housing spokes supporting the mating housing hub. The additional valve element extends through the mating housing hub. The additional valve element is a poppet that includes a head that seals against a valve seat in the mating housing and a stem that extends from a backside of the head and through the mating housing hub, and the head includes a frustoconical vane that extends from the backside and defines a cavity around the stem.

In a further embodiment of any of the foregoing embodiments, the first housing includes a hub and spokes supporting the hub. The valve element extends through the hub. The valve element is a poppet that includes a head that seals against a valve seat in the first housing and a stem that extends from a backside of the head and through the hub, and the head includes a frustoconical vane that extends from the backside and defines a cavity around the stem.

In a further embodiment of any of the foregoing embodiments, the frustoconical vane includes vane slots, and in the closed position. The hub is at least partially disposed in the cavity and the spokes extend through the vane slots.

In a further embodiment of any of the foregoing embodiments, the guide link includes a guide link hub that is fixed with the valve element and guide link arms that extend outwardly from the guide link hub, the guide link arms carrying the cam rollers.

In a further embodiment of any of the foregoing embodiments, the first housing and the second housing are rotationally secured together in a ball bearing joint, the first housing includes an actuator operable to rotate the first housing, and further including a proximity sensor operable to determine a relative rotational position between the first housing and the second housing.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
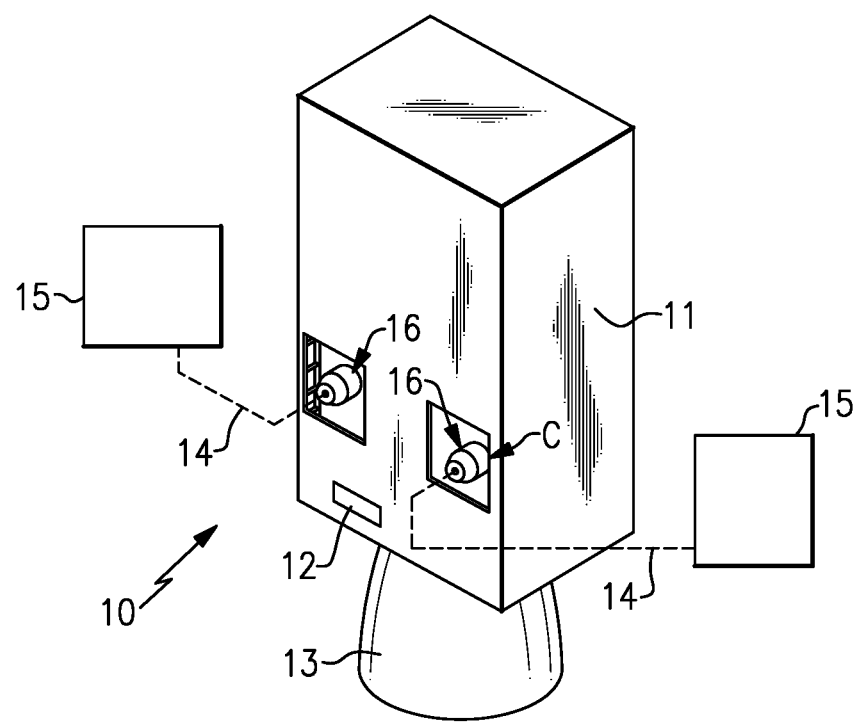
FIG. 1 illustrates a rocket motor.

FIG. 1 illustrates a rocket motor 10 to demonstrate example aspects of a dynamic dry disconnect coupling that is disclosed herein. It is to be appreciated, however, that applications other than a rocket motor will also benefit from this disclosure.

The rocket motor 10 generally includes a rocket motor body 11, a combustor 12, a nozzle 13 attached with the combustor 12, and supply lines 14 that connect propellant tanks 15 with the combustor 12. There is a dynamic dry connector coupling C in each supply line 14. As will be described in further detail below, the coupling C includes a valve 16 that serves to open and close flow through the supply line 14, as well as permit easy connection and disconnection from the propellant tanks 15. For instance, easy connection and disconnection is desired for installation and removal of the rocket motor 10 into/from a vehicle, to permit access for maintenance or inspection of the rocket motor 10, and/or to render the rocket motor 10 operable or inoperable.

Figure 2A:
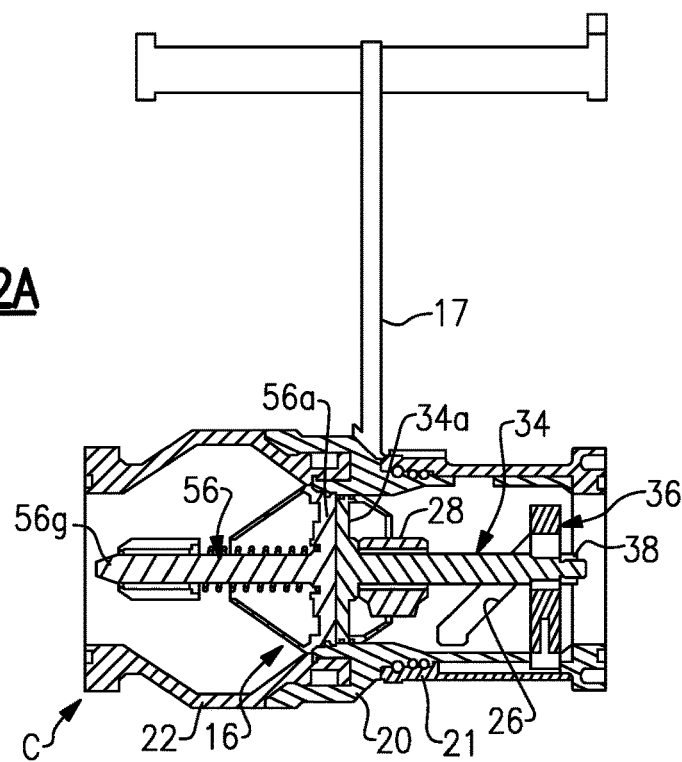
FIG. 2A illustrates a coupling of the rocket motor in a closed state.
Figure 2B:
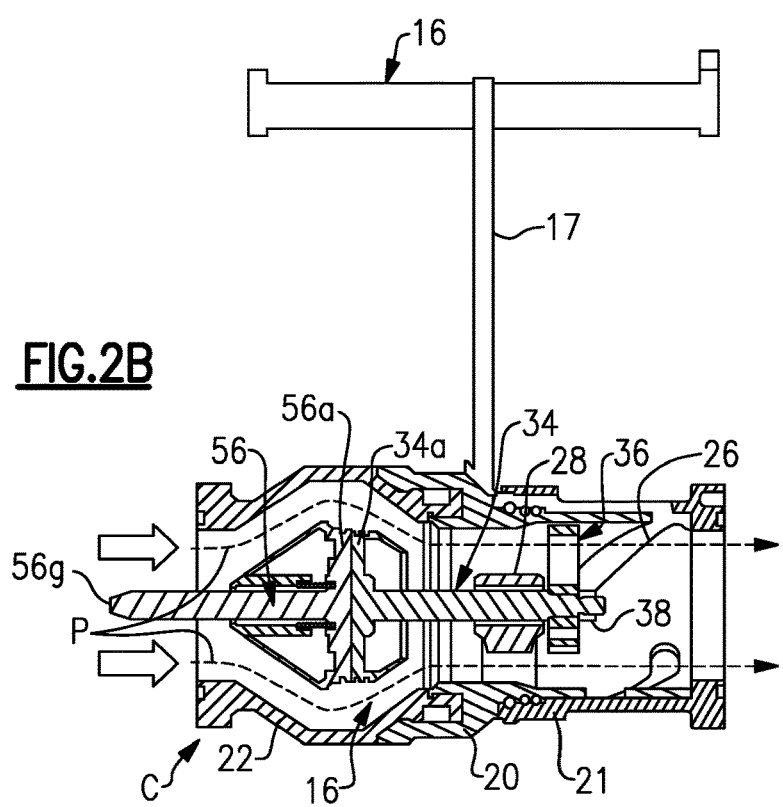
FIG. 2B illustrates the coupling in an open state.

FIGS. 2A and 2B show sectioned views of the coupling C with the valve 16 in, respectively, a closed state and an open state. In the orientation shown, the left-hand side of the valve 16 is adapted to connect to an inlet side of the supply line 14, i.e. to receive propellant from the propellant tank 15. The right-hand side of the valve 16 is adapted to connect to an outlet side of the supply line 14, i.e. to deliver propellant to the combustor 12. In these regards, each side of the coupling C may include a bolt flange for securing the connector pieces of the coupling C. It is to be appreciated, however, that the coupling is not limited to bolt flanges and that other types of connections may be used. In the closed state, the valve 16 blocks flow to the combustor 12, and in the open state the valve 16 permits flow to the combustor 12. In this regard, the valve 16 includes an actuator 17 for switching the valve 16 between the open and closed states, i.e., the coupling C is dynamic in that it can be switched via the actuator 17 between the open and closed states. The actuator 17 is a manual handle as shown but may alternatively be a powered device for automation of the valve 16.

Figure 4:
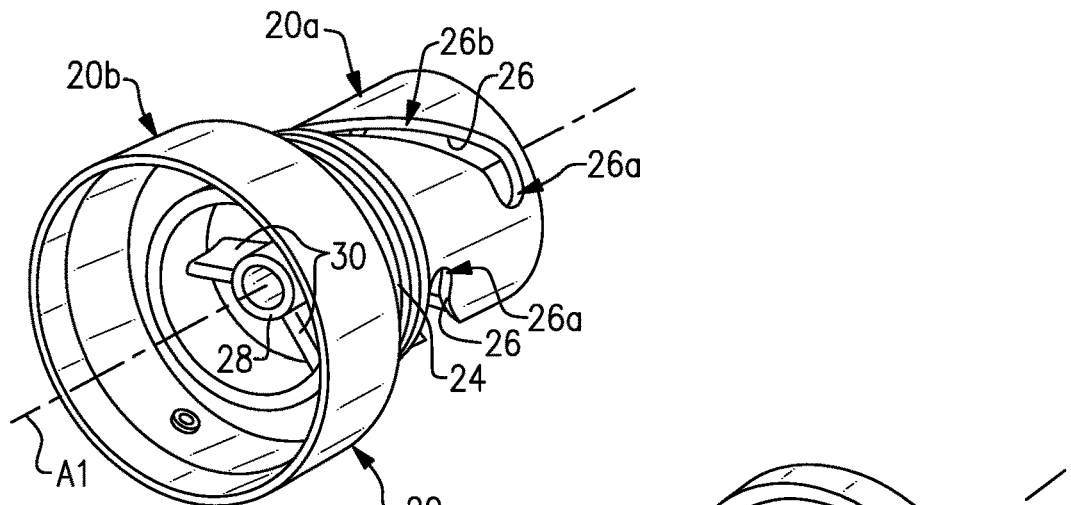
FIG. 4 illustrates a first housing of the coupling.
Figure 5:
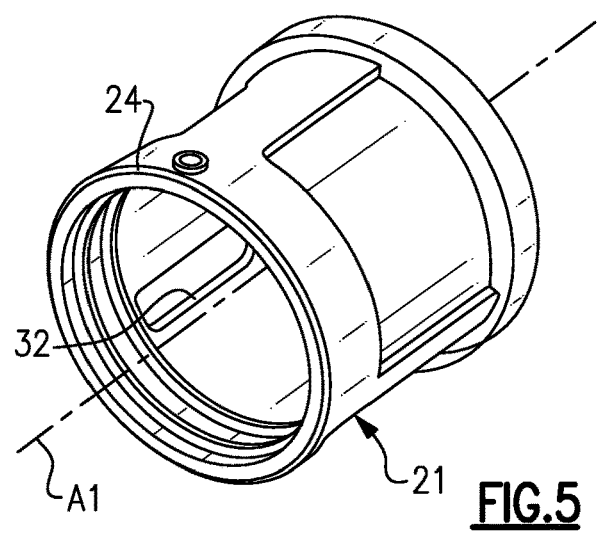
FIG. 5 illustrates a second housing of the coupling.

The body of the coupling C includes three housings 20/21/22 that surround a flow path P through the valve 16 (FIG. 2B). Housings 20 and 21 are first and second housings, and housing 22 is a mating housing. The first and second housings 20/21 are also shown in a sectioned view in FIG. 3, and in isolated views in FIGS. 4 and 5, respectively. The first and second housings 20/21 serve as a female half of the coupling C, while the third housing 22 serves as the male half.

The housings 20/21 are rotationally secured together in a ball bearing joint 23. The joint 23 includes a groove 24 in each of the housings 20/21 that provides a race for containing ball bearings 24a. The groove 24 of housing 20 provides an inner half of the race, and the groove 24 of the housing 21 provides an outer half of the race. The cross-section of the race is slightly larger than the cross-section of the ball bearings 24a, to permit limited movement of the ball bearings 24a in the race. The cross-section of the race, however, is sufficiently small to prevent the ball bearings 24a from moving entirely into either one of the grooves 24. Thus, once the ball bearings 24a are installed into the race (e.g., via an inlet hole in the housing 21), there is not enough clearance around the ball bearings 24a to permit the housings 20/21 to be separated. The ball bearings 24a thus lock the housings 20/21 together, while permitting the housing 20 to rotate clockwise and counterclockwise relative to the housing 21.

The first housing 20 includes a main body 20a that is generally cylindrical and a mouth section 20b that is also cylindrical but is of larger diameter. The main body 20a defines helical cam slots 26 there through. In this example, there are three such cam slots 26, and the cam slots 26 are disposed at approximately 120° intervals about a central axis A1. Each cam slot 26 defines radiused slot ends 26a and an intermediate slot portion 26b that spans from one radiused slot end 26a to the other.

The first housing 20 additionally includes a hub 28 and spokes 30 that support the hub 28. The hub 28 is a hollow cylinder that, along with the main body 20a and the mouth 20b, is disposed about the central axis A1. Each spoke 30 is attached to the outer side of the hub 28 and to the inner side of the main body 20a such that the hub 28 is fixed along the axis A1.

The second housing 21 (FIG. 5) is also generally cylindrical about the axis A1. The main body 20a of the first housing 20 is received into the second housing 21. The second housing 21 includes linear cam tracks 32 on its inner side. In this example, there are three such linear cam tracks 32 that are disposed at approximately 120° intervals about the central axis A1. Each linear cam track 32 is a blind slot that is elongated in the axial direction. The profiles of the linear cam tracks 32 protrude on the outer side of the second housing 21 and serve as ribs that stiffen the second housing 21.

Figure 3:
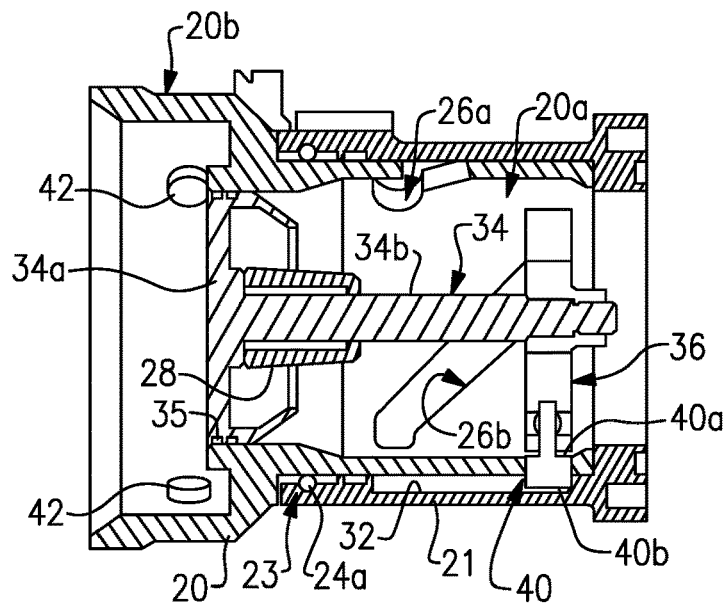
FIG. 3 illustrates a female half of the coupling.
Figure 6:
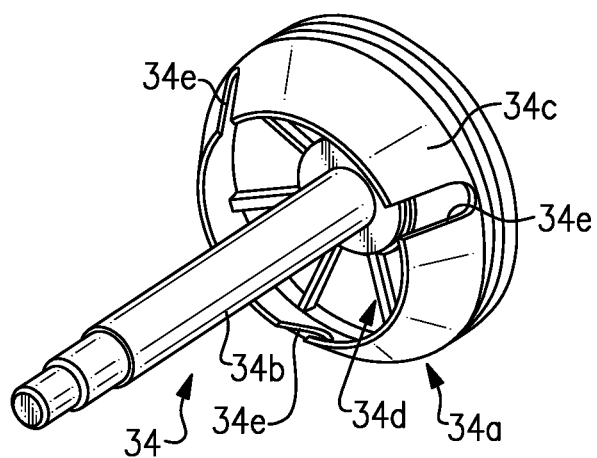
FIG. 6 illustrates a valve element of the female half of the coupling.

As shown in FIG. 3, inside of the first housing 20 there is a valve element 34 and guide link 36. The valve element 34 is also shown in an isolated view in FIG. 6. In this example, the valve element 34 is a poppet that includes a head 34a that seals against a valve seat 35 (FIG. 3) and a stem 34b that extends from a backside of the head 34b and through the hub 28 of the first housing 20. The head 34a includes a frustoconical vane 34c that extends from the backside and defines a cavity 34d around the base of the stem 34b. As shown, the vane 34c defines three slots 34e that are in register with the spokes 30 of the housing 20. The spokes 30 are received into and out of the slots 34e when the valve element 34 moves.

Figure 7:
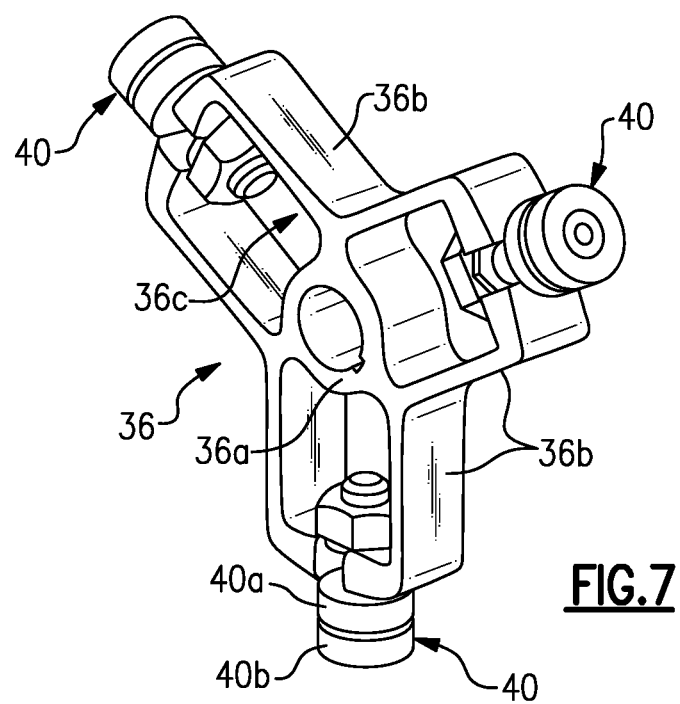
FIG. 7 illustrates a guide link of the female half of the coupling.
Figure 8:
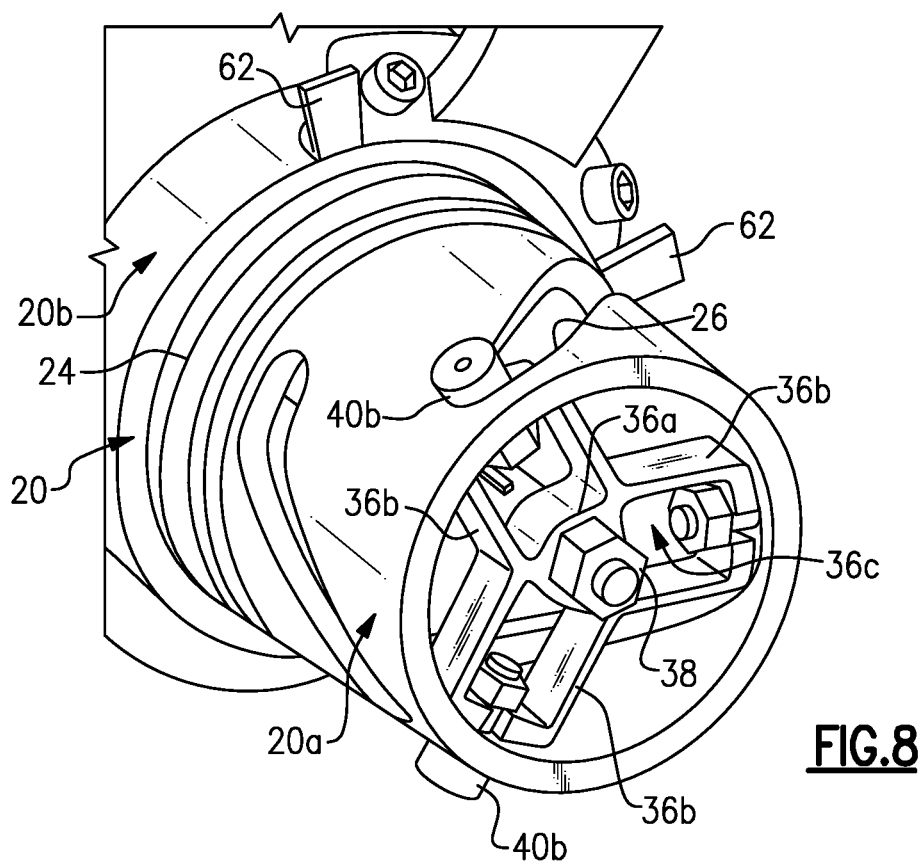
FIG. 8 illustrates an assembled view of the first housing, guide link, and valve element of the female half of the coupling.

The valve element 34 is fixed with the guide link 36, which is also shown in FIGS. 7 and 8. The guide link 36 includes a guide link hub 36a that is fixed with the valve element 34. For example, the end of the stem 34b is received through an opening in the guide link hub 36a and secured thereto with a nut 38. Guide link arms 36b extend radially outwardly from the guide link hub 36a. In this example, the guide link arms 36b each define an open flow window 36c there through. The windows 36c serve to reduce interference with fluid flow past the guide link 36 (in comparison to the arms 36b being solid). The guide link arms 36b carry cam rollers 40 on the radially outer ends thereof. Each cam roller 40 has an inner roller portion 40a and an outer roller portion 40b. As shown in FIG. 8, the inner roller portion 40a rides in the helical cam slots 26 of the main body 20a of the first housing 20. The outer roller portions 40b protrude radially outwardly from the main body 20a. The helical cam slots 26 and the linear cam tracks 32 are in register with each other such that (see FIG. 3) the outer roller portions 40b ride in the linear cam tracks 32 of the second housing 21. The guide link 36 can thus move axially via the inner roller portions 40 travelling along the helical cam slots 26 (when the first housing rotates) and the outer roller portions 40b travelling along the linear cam tracks 32.

Figure 9:
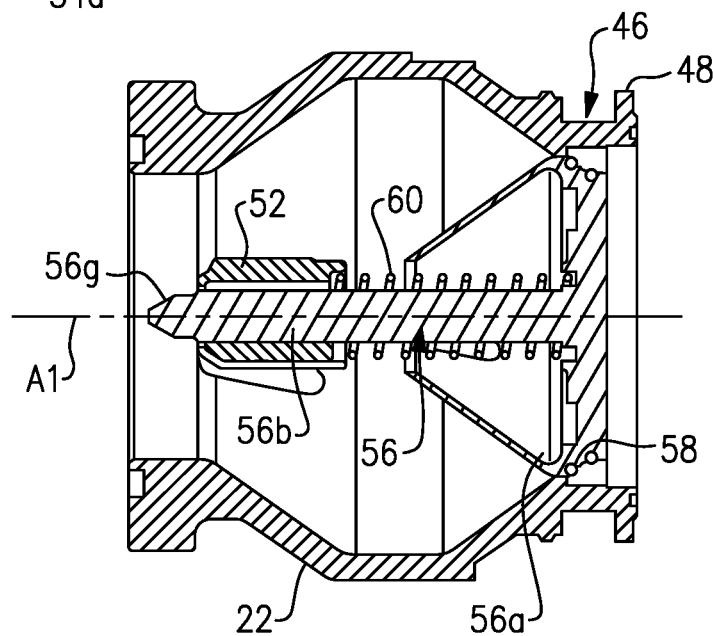
FIG. 9 illustrates a sectioned view of the male half of the coupling.
Figure 10:
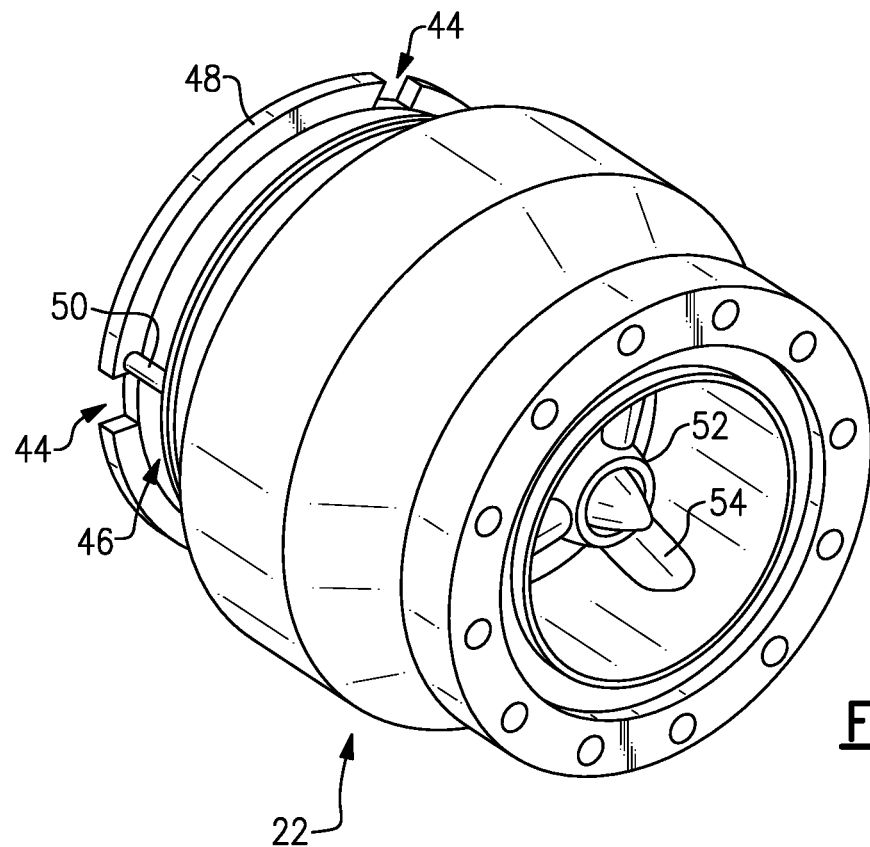
FIG. 10 illustrates another view of the male half of the coupling.
Figure 11:
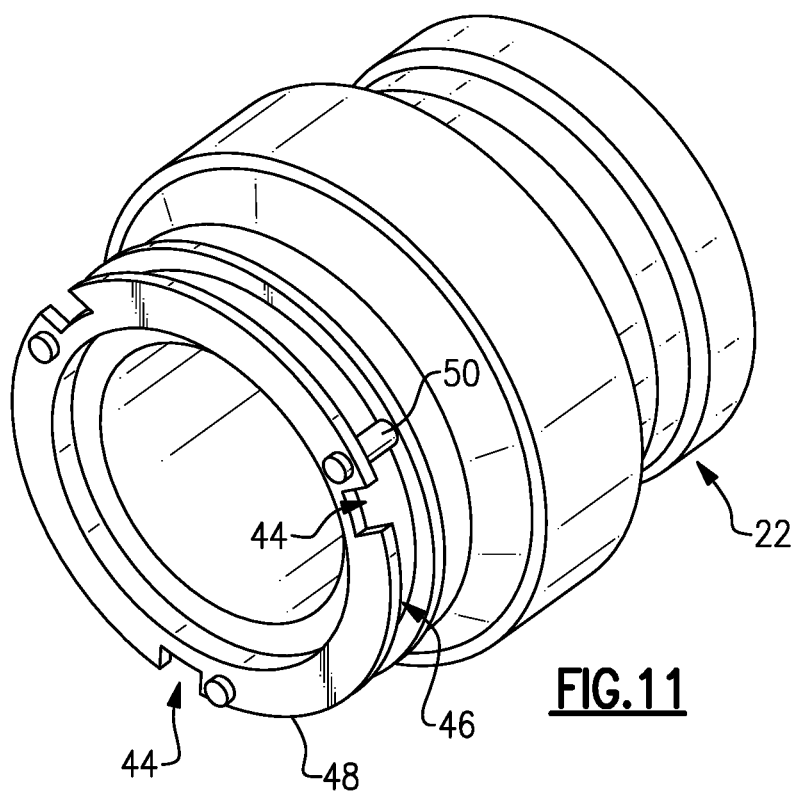
FIG. 11 illustrates an additional view of the male half of the coupling.

The mating housing 22 is shown in isolated views in FIGS. 9-11. The mating housing 22 is also generally cylindrical about the axis A1 and is secured with the first housing 20. For instance, the mouth section 20b of the first housing 20 serves as the female half of the coupling C, and the mating housing 22 serves as the male half of the coupling to be received into the female half. In this regard, the mouth section 20b includes prongs 42 (FIG. 3), such as roller bearings, that are received through respective slot entries 44 into a circumferential slot 46 in the mating housing 22 (FIG. 10). Relative rotation between the mating housing 22 and the first housing 20 then causes the prongs 42 to move circumferentially from the entry position in which the prongs 42 are aligned with the slot entries 44 to a locked position in which the prongs 42 are circumferentially offset from the slot entries 44. In this offset position, a lip 48 prevents the prongs 42 from moving axially, thereby locking the mating housing 22 and the first housing 21 together. Stops 50 (FIGS. 10 and 11) may be provided in the circumferential slot 46 to serve as end points for circumferential movement of the prongs 42. Additionally, the stops 50 are located adjacent the slot entries 44 such that upon insertion of the prongs 42 into the circumferential slot 46, rotation can occur in only one direction. In this manner, the coupling C can be readily connected or disconnected.

Referring to FIG. 10, similar to the first housing 20, the mating housing 22 includes a mating housing hub 52 and mating housing spokes 54 that support the mating housing hub 52. The mating housing hub 52 is a hollow cylinder that is also disposed about the central axis A1. Each spoke 54 is attached to the outer side of the hub 28 and to the inner side of the housing 22. As shown in FIG. 9, there is an additional, second valve element 56 in the mating housing 22.

Figure 12:
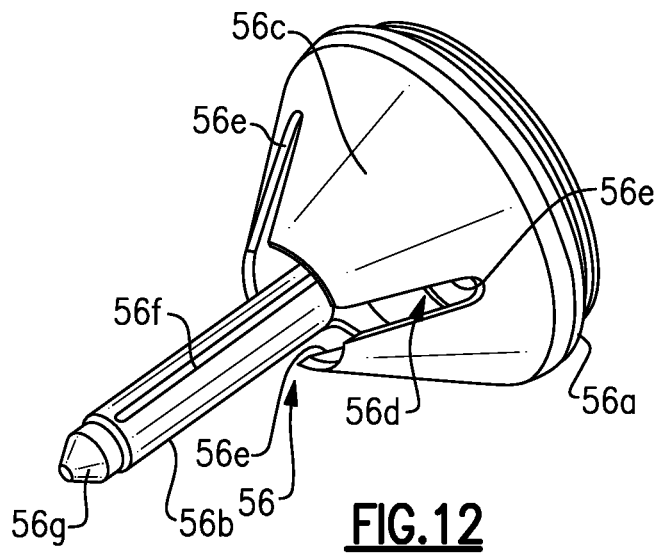
FIG. 12 illustrates a valve element of the male half of the coupling.

The valve element 56 is also shown in an isolated view in FIG. 12. The valve element 56 is a poppet that includes a head 56a that seals against a valve seat 58 in the mating housing 22 and a stem 56b that extends from a backside of the head 56a and through the mating housing hub 52. The head 56a includes a frustoconical vane 56c that extends from the backside and defines a cavity 56d around the base of the stem 56b. Like the vane 34c of the first valve element 34, the vane 56c includes slots 56e. The spokes 54 of the housing 22 are in register with the slots 56e to be received into and out of the slots 56e when the valve element 56 moves. The stem 56b has a keyway 56f, which serves to receive an anti-rotation key (not shown) that also linearly guides the valve element 56. Additionally, the stem 56b includes a tapered tip 56g, to facilitate fluid flow around the valve element 56 through the flow path P. As shown in FIG. 9, there is a spring 60 around the stem 56b and disposed at least partially in the cavity 56d. The spring 60 biases the valve element 56 toward a sealed position against the valve seat 58. As shown in FIGS. 2A and 2B, the head 56a of the valve member 56 is engaged with the head 34a of the valve element 34. In the example shown, the heads 34a/56a are in contact with each other, but intermediate structures may also be used as long as movement of the valve member 34 causes movement of the valve element 56.

To switch the valve 16 between the open and closed states, the actuator 17 is moved in order to rotate the first housing 20 relative to the second housing 21. For instance, when initially in the closed state, the cam rollers 40 are positioned in the distal radiused slot ends 26a (relative to the hub 28). Rotation of the first housing 20 causes rotation of the helical cam slots 26. The rotation of the helical slots 26 induces the inner roller portions 40a of the cam rollers 40 to move out of the radiused slot ends 26a and travel along the intermediate slot portions 26b of the helical cam slots 26. The outer roller portions 40b travel along the linear cam tracks 32. The movement of the helical cam slots 26 drives the guide link 36 to translate linearly along the axis A1. The guide link 36, being coupled with the valve element 34, moves the valve element 34 off of the valve seat 35. Since the valve element 34 is engaged with the valve element 56, the movement of the valve element 34 from the seat 35 causes the head 34a of the valve element 34 to drive against the head 56a of the valve element 56, thereby moving the valve element 56 from its valve seat 58 against the bias force of the spring 60. With both valve elements 36/56 off of their respective valve seats, the flow path P is open to allow flow through the valve 16. The first housing 20 can be rotated to a fully open position in which the cam rollers 40 reach the proximal radiused slot ends 26a closest to the hub 28. In the example shown, a counterclockwise rotation of the first housing 20 moves the valve 16 toward the open state. However, it is to be understood that the helical cam slots 26 could alternatively be oppositely oriented such that clockwise rotation causes opening.

In the open state (FIG. 2B) flow enters into the mating housing 22 and flows around the valve element 56 (from left to right in the figure). The tapered end 56g facilitates splitting the flow around the valve element 56. In the open state, the vane 56c encompasses at least a portion of the hub 52 and the spokes 54 are received into the slots 56e. There is limited space between the vane 56c, the hub 52, and the spokes 54 for flow into the cavity 56d of the valve element 56. Therefore, once filled, vane 56c can in essence act as a solid deflector to guide flow around the valve element 56 and around the head 34a of valve element 34 to thereby reduce pressure drop. The flow then continues down the flow path P around the stem 34b of the valve element 34 and then through the guide link 36 before exiting the second housing 21 (at the right-hand side in FIG. 2B). Additionally, movement of the spokes 54 into the slots 56e of the vane 56c facilitates a compact arrangement. For instance, in the absence of the slots 56e, the valve element 56 could only be moved up to the point where the spokes 54 hit the edge of the vane 56c, which would necessitate a longer stem to accommodate the same length of travel.

From the open state, clockwise rotation of the first housing 20 causes rotation of the helical cam slots 26 and inducement of the inner roller portions 40a of the cam rollers 40 to retract back along the helical slots 26 and the outer roller portions 40b to retract back along the linear cam tracks 32. This drives the guide link 36 to translate linearly back along the axis A1. The guide link 36, being coupled with the valve element 34, retracts the valve element 34 toward its valve seat 35. Similar to the valve element 56, movement of the spokes 30 of the housing 20 into the slots 34e of the vane 34c facilitates a compact arrangement. Since the valve element 34 is engaged with the valve element 56, the movement of the valve element 34 toward the seat 35 releases the valve element 56 such that the bias of the spring 60 returns the head 56a of the valve element 56 to its valve seat 58. With both valve elements 34/56 on their valve seats, the valve 16 is in the closed state. As will be appreciated, single or double seals may be provided at various locations in the valve 16, such as at the valve seats 35/58, on the heads 34a/56a of the valve members 34/56, and in the ball bearing joint 23, to facilitate sealing and meet sealing requirements.

Figure 13:
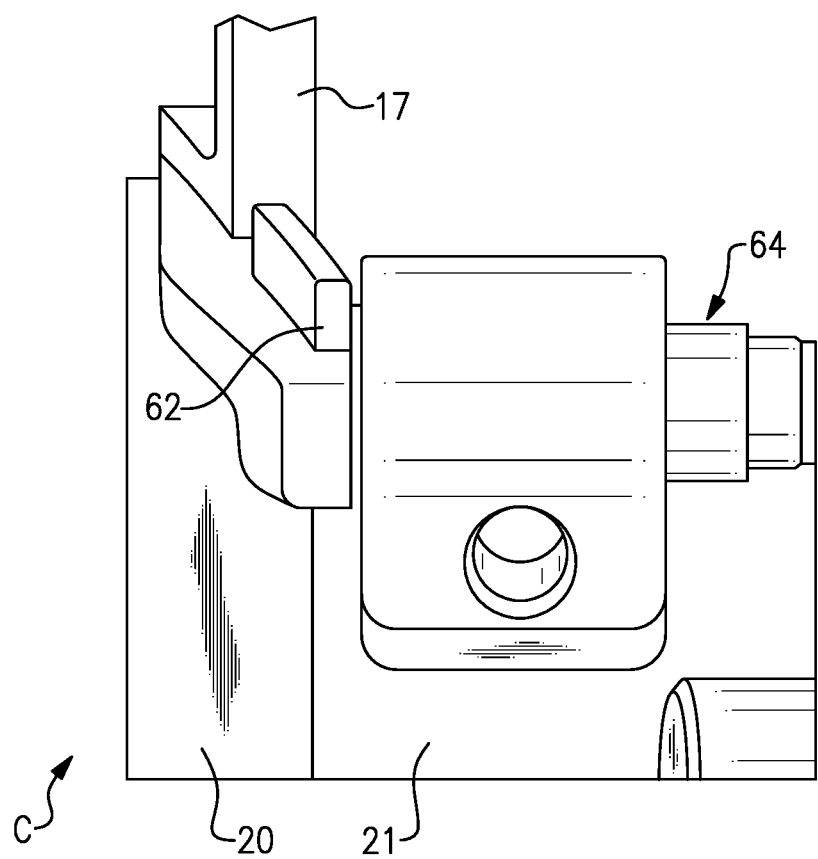
FIG. 13 illustrates a proximity sensor on the coupling.

As shown in FIG. 13, the coupling C also demonstrates an example in which there is valve status capability. As shown, the actuator 17 includes sensor targets 62 (see also FIG. 8) that rotate with the first housing 20. The position of the targets 62 represents the relative rotational position between the first and second housings 20/21, which corresponds to the fully open and fully closed state of the valve 16. There is a proximity sensor 64 mounted on the second housing 21. The proximity sensor 64 detects proximity of the targets 62 and generates electric signals that are representative of the target positions. The signals may then be used to generate a valve status indication, such as an indication of whether the valve 16 is in the open state, the closed state, or a partially open state in between.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A coupling comprising:
   a first housing and a second housing, the first housing being rotatable relative to the second housing and nested within the second housing, the first housing having helical cam slots and the second housing having linear cam tracks;
   a valve element; and
   a guide link in the first housing and fixed with the valve element, the guide link carrying cam rollers, the cam rollers riding in the helical slots and the linear cam tracks,
   wherein rotation of the first housing causes rotation of the helical slots, the rotation of the helical slots inducing the cam rollers to travel along the helical slots and along the linear cam tracks such that the guide link translates linearly, the valve element moving with the guide link between open and closed positions, and wherein the quide link is rotationally fixed with respect to the second housing.

2. The coupling as recited in claim 1, further comprising a mating housing securable with the first housing and an additional valve element in the mating housing that is engaged with the valve element such that the movement of the valve element also moves the additional valve element.

3. The coupling as recited in claim 2, wherein the mating housing includes a mating housing hub and mating housing spokes supporting the mating housing hub, and the additional valve element extends through the mating housing hub.

4. The coupling as recited in claim 3, wherein the additional valve element is a poppet that includes a head that seals against a valve seat in the mating housing and a stem that extends from a backside of the head and through the mating housing hub, and the head includes a frustoconical vane that extends from the backside and defines a cavity around the stem.

5. The coupling as recited in claim 4, further comprising a spring disposed at least partially in the cavity and biasing the additional valve element toward a sealed position.

6. The coupling as recited in claim 4, wherein the stem includes a tapered tip.

7. The coupling as recited in claim 1, wherein the first housing includes a hub and spokes supporting the hub, and the valve element extends through the hub.

8. The coupling as recited in claim 7, wherein the valve element is a poppet that includes a head that seals against a valve seat in the first housing and a stem that extends from a backside of the head and through the hub, and the head includes a frustoconical vane that extends from the backside and defines a cavity around the stem.

9. The coupling as recited in claim 8, wherein the frustoconical vane includes vane slots, and in the closed position, the hub is at least partially disposed in the cavity and the spokes extend through the vane slots.

10. The coupling as recited in claim 1, wherein the guide link includes a guide link hub that is fixed with the valve element and guide link arms that extend outwardly from the guide link hub, the guide link arms carrying the cam rollers.

11. The coupling as recited in claim 10, wherein the guide link arms each define an open flow window there through.

12. The coupling as recited in claim 1, wherein the first housing and the second housing are rotationally secured together via a ball bearing joint.

13. The coupling as recited in claim 1, further comprising a proximity sensor operable to determine a relative rotational position between the first and second housings.

14. The coupling as recited in claim 1, wherein the first housing includes an actuator operable to rotate the first housing.

15. The coupling as recited in claim 1, wherein the first housing and the second housing are rotationally secured together via a ball bearing joint, the first housing includes an actuator operable to rotate the first housing, and the coupling further comprising a proximity sensor operable to determine a relative rotational position between the first housing and the second housing.

16. A rocket motor comprising:
   a propellant tank holding propellant;
   a combustor;
   a nozzle attached with the combustor;

a supply line fluidly connecting the propellant tank and the combustor; and a coupling situated in the supply line, the coupling including:
- a first housing and a second housing, the first housing being rotatable relative to the second housing and nested within the second housing, the first housing having helical cam slots and the second housing having linear cam tracks,
- a valve element, and
- a guide link in the first housing and fixed with the valve element, the guide link carrying cam rollers, the cam rollers riding in the helical slots and the linear cam tracks,
- wherein rotation of the first housing rotates the helical slots, the rotation of the helical slots inducing the cam rollers to travel along the helical slots and along the linear cam tracks such that the guide link translates linearly, the guide link moving the valve element between open and closed positions,
- wherein the quide link is rotationally fixed with respect to the second housing.

17. The rocket motor as recited in claim 16, further comprising a mating housing securable with the first housing and an additional valve element in the mating housing that is engaged with the valve element such that the movement of the valve element also moves the additional valve element, the mating housing includes a mating housing hub and mating housing spokes supporting the mating housing hub, the additional valve element extends through the mating housing hub, the additional valve element is a poppet that includes a head that seals against a valve seat in the mating housing and a stem that extends from a backside of the head and through the mating housing hub, and the head includes a frustoconical vane that extends from the backside and defines a cavity around the stem.

18. The rocket motor as recited in claim 16, wherein the first housing includes a hub and spokes supporting the hub, the valve element extends through the hub, the valve element is a poppet that includes a head that seals against a valve seat in the first housing and a stem that extends from a backside of the head and through the hub, and the head includes a frustoconical vane that extends from the backside and defines a cavity around the stem.

19. The rocket motor as recited in claim 18, wherein the frustoconical vane includes vane slots, and in the closed position, the hub is at least partially disposed in the cavity and the spokes extend through the vane slots.

20. The rocket motor as recited in claim 16, wherein the guide link includes a guide link hub that is fixed with the valve element and guide link arms that extend outwardly from the guide link hub, the guide link arms carrying the cam rollers.

* * * * *